United States Patent
Nesterenko et al.

(10) Patent No.: US 7,275,850 B2
(45) Date of Patent: Oct. 2, 2007

(54) BACKLIGHT UNIT

(75) Inventors: Dmitri Nesterenko, Suwon-si (KR); Sun-il Kim, Suwon-si (KR); Yoon-sun Choi, Incheon-si (KR); Su-mi Lee, Hwaseong-si (KR); Kyung-hee You, Suwon-si (KR); Jee-hong Min, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 185 days.

(21) Appl. No.: 11/040,100

(22) Filed: Jan. 24, 2005

(65) Prior Publication Data
US 2005/0201120 A1    Sep. 15, 2005

(30) Foreign Application Priority Data
Jan. 24, 2004    (KR) .................. 10-2004-0004562

(51) Int. Cl.
*F21V 7/04* (2006.01)
*F21V 8/00* (2006.01)

(52) U.S. Cl. ........................ 362/609; 362/610

(58) Field of Classification Search ............ 362/608, 362/609, 610, 612, 613, 621, 622, 559, 560
See application file for complete search history.

(56) References Cited

U.S. PATENT DOCUMENTS

| | | | | |
|---|---|---|---|---|
| 4,975,808 A | * | 12/1990 | Bond et al. .................. 362/609 |
| 5,711,592 A | * | 1/1998 | Hotta ........................ 362/621 |
| 6,079,838 A | * | 6/2000 | Parker et al. .............. 362/617 |
| 6,474,826 B1 | * | 11/2002 | Tanaka et al. ............ 362/612 |
| 6,749,311 B2 | * | 6/2004 | Suzuki et al. ............. 362/610 |
| 7,073,933 B2 | * | 7/2006 | Gotoh et al. ............... 362/624 |
| 7,163,331 B2 | * | 1/2007 | Suzuki et al. ............. 362/610 |

FOREIGN PATENT DOCUMENTS

KR    2002-0041479 A    6/2002

* cited by examiner

*Primary Examiner*—Alan Cariaso
(74) *Attorney, Agent, or Firm*—Sughrue Mion Pllc.

(57) ABSTRACT

An edge light type backlight unit having an improved light-reception portion. The backlight unit includes one or more light sources that emit light, a light guide panel that guides the propagation of light incident on one side edge thereof, one or more light-reception portions having a first entrance face slanted opposite the side edge of the light guide panel on which the light is incident at a predetermined angle, and one or more reflecting elements that are disposed between each of the light-reception portions and each of the light sources and guides the light emitted by the light source so that it is incident on the first entrance face.

13 Claims, 7 Drawing Sheets

BACKLIGHT UNIT

BACKGROUND OF THE INVENTION

This application claims priority from Korean Patent Application No. 10-2004-0004562, filed on Jan. 24, 2004, in the Korean Intellectual Property Office, the disclosure of which is incorporated herein in its entirety by reference.

1. Field of the Invention

The present invention relates to an edge light type backlight unit, and more particularly, to a backlight unit having an improved light-reception portion.

2. Description of the Related Art

Typically, a liquid crystal display (LCD) device is one of light-reception flat panel displays and needs a separate light source to produce an image since the LCD itself does not emit light. To this end, a backlight unit is located behind the LCD device and emits light. The backlight units are used in LCD devices as well as in surface light source systems such as illuminating signs.

Backlight units are classified into direct light type units and edge light type units according to the position of a light source. For a direct light type unit, a lamp disposed beneath a LCD panel directly emits light onto the LCD panel. For an edge light type unit, a lamp located on an edge of a light guide panel (LGP) emits light onto the LCD panel via the LGP.

An edge light type unit may include a linear light source or a point light source as an illuminant. Representative examples of the linear light source and point light source are a cold cathode fluorescent lamp (CCFL) having two electrodes at opposite ends within a tube and a light emitting diode (LED), respectively.

While a CCFL provides bright white light, high brightness, high luminous uniformity, and a large area design, it operates in response to a high frequency alternating current (AC) signal and has a narrow temperature range. In contrast to the CCFL, an LED exhibits lower brightness and luminous uniformity. However, the LED operates according to a direct current (DC) signal, has a long life span and a wide temperature range and minimizes the thickness.

The LGP, which is used for an edge light type unit, converts light emitted by a light source through its edge into surface light and outputs light in a vertical direction. The LGP has a scattering or holographic pattern formed by a printing or machining method for conversion into the surface light.

Figure 1:
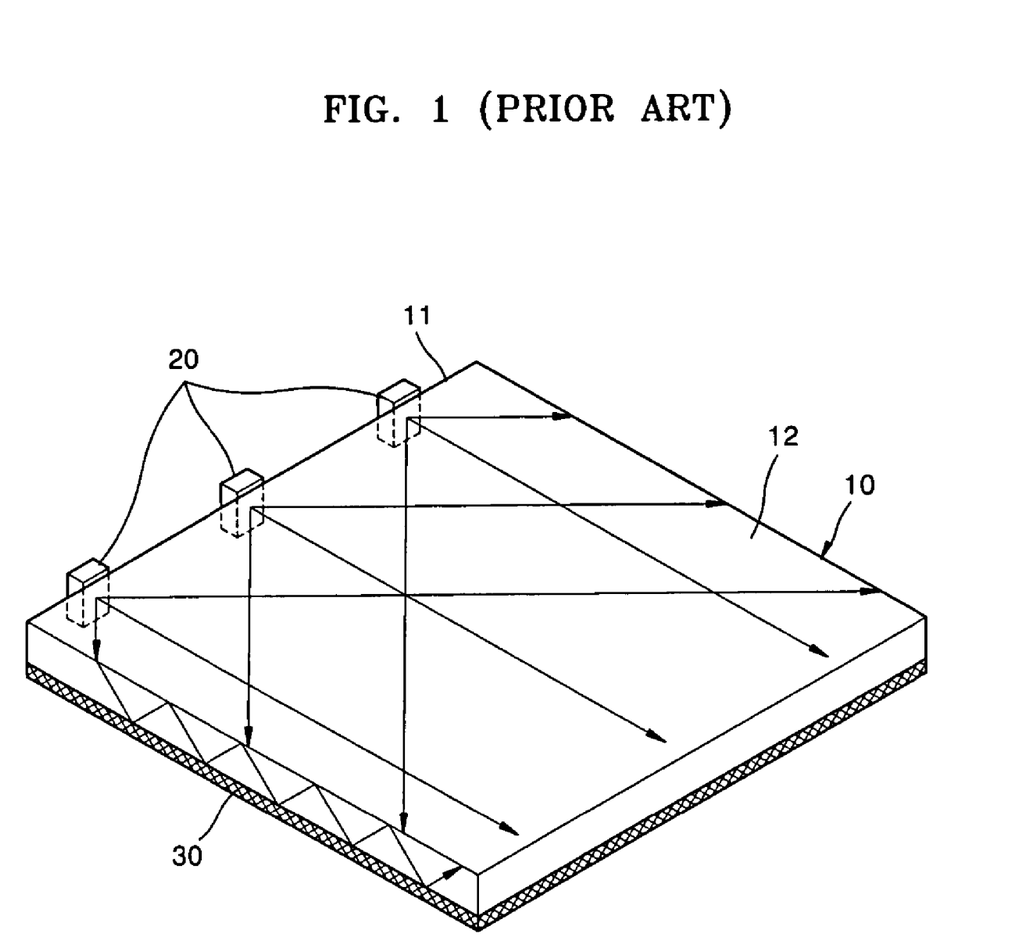
FIG. 1 is a schematic perspective view of a conventional edge light type backlight unit using light emitting diodes (LEDs) as a light source.
Figure 2:
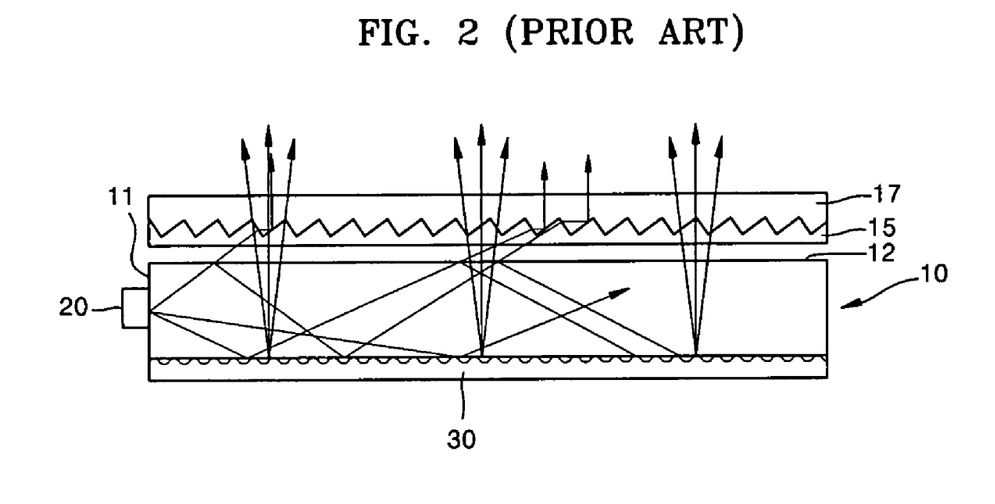
FIG. 2 is a cross-sectional view of FIG. 1.
Figure 3:
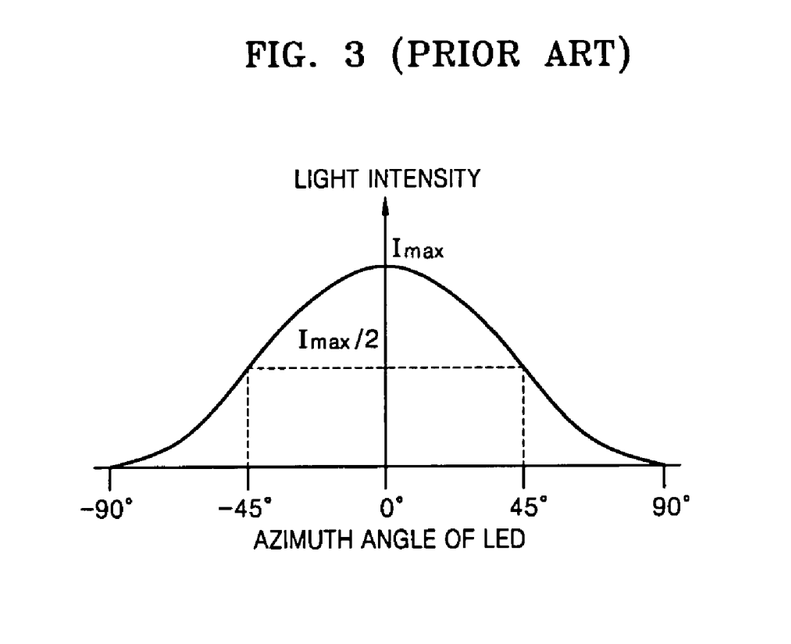
FIG. 3 is a graph illustrating an azimuth angle of an LED.

FIG. 1 is a schematic perspective view of a conventional edge type backlight unit using a point light source, FIG. 2 is a cross-sectional view of FIG. 1, and FIG. 3 is a graph illustrating an azimuth angle of an LED. Referring to FIGS. 1-3, three LEDs 20, which are point light sources, are disposed along one edge 11 of a LGP 10. The LGP 10 has a holographic pattern 30 at the bottom thereof, which allows light emitted by the LED 20 to be directed onto a light-emission surface 12. The LED 20 emits light toward the edge 11 in an angular range between −90° and +90° about an optical axis as shown in FIG. 3. In this case, an azimuth angle at which light having intensity $I_{max}/2$ that is half the maximum light intensity $I_{max}$ is emitted is called a forward half maximum (FWHM) angle. A typical LED has a FWHM angle between about −45° and +45°.

The light emitted from the LED 20 is incident on the LGP 10 through the edge 11. The holographic pattern 30 with a diffractive grating structure and which is oriented in a predetermined direction converts the incident light into surface light and diffracts the surface light onto the light-emission surface 12.

Furthermore, as the range of azimuth angles of light being incident on the holographic pattern 30 decreases, uniformity of brightness over the light-emission surface 12 increases. Uneven brightness over the light-emission surface 12 makes a screen appear mottled. For example, while a variation in brightness of about 0.9 within a narrow range of about 1 cm may be detected as a stain on the screen, a slow variation in brightness of about 0.8 between the screen's center and corners may not be detected as a stain. Thus, at least brightness uniformity over 0.8 is required to prevent a stain on the screen. To achieve a better quality image, brightness uniformity over 0.9 is needed.

Figure 4:
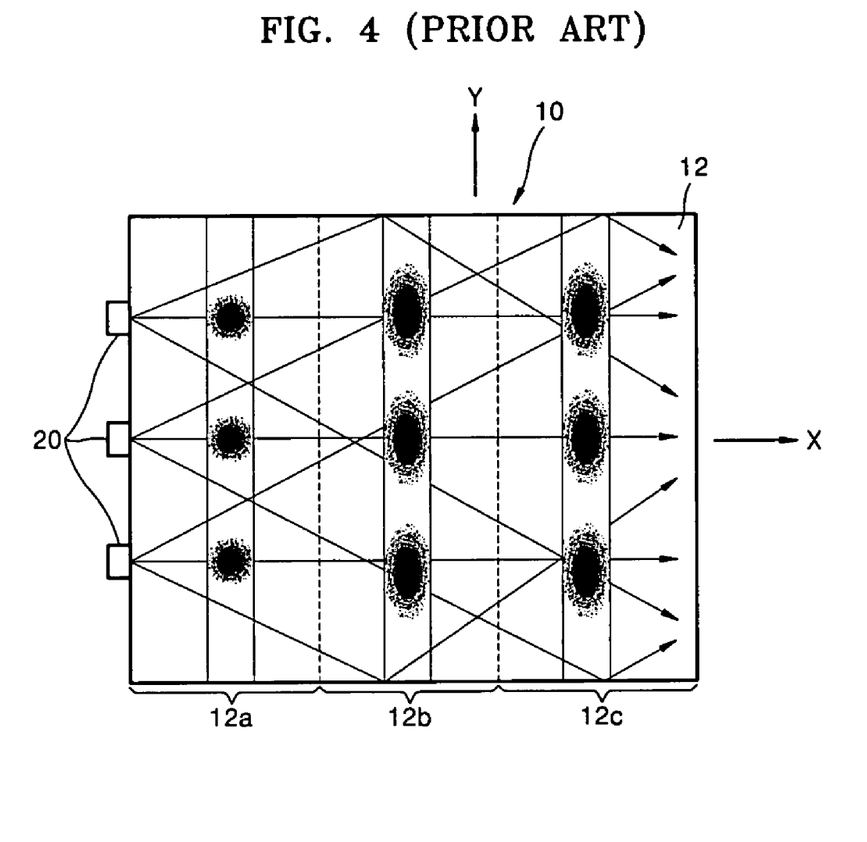
FIG. 4 illustrates distribution of light output by the conventional backlight unit of FIG. 1.

FIG. 4 is a plan view of FIG. 1, which illustrates distribution of light output through the light-emission surface 12. Referring to FIG. 4, the light-emission surface 12 is divided into a first region 12a, a second region 12b, and a third region 12c, which are disposed in a direction away from the edge 11. The distribution of light output from each of the regions 12a, 12b, and 12c is as shown in FIG. 4. That is, the second and third regions 12b and 12c have wider distributions of outgoing light than the first region 12a.

Figure 5:
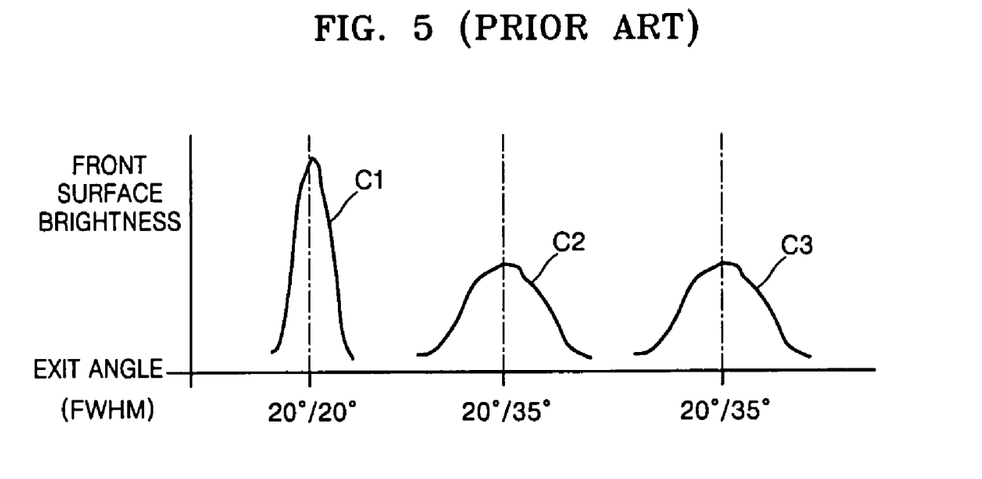
FIG. 5 is a graph illustrating brightness on the front light-emission surface of the conventional backlight unit of FIG. 1.

FIG. 5 is a graph of brightness vs. exit angle represented by a FWHM angle. Three curves C1-C3 represent brightnesses of light output from the first region 12a, the second region 12b, and the third region 12c, respectively. As is evident by FIG. 5, the brightness on the first region 12a is greater than those on the second region 12b and the third region 12c. The first region 12a has a FWHM angle of 20°/20° while the second region 12b and the third region 12c have a FWHM angle of 20°/35° where the values before and after the slash "/" denote FWHM angles in X and Y directions in FIG. 4, respectively.

The difference in brightness on each region 12a, 12b, or 12c arises because the range of azimuth angles of light incident on the holographic pattern 30 is narrower in the first region 12a than in the remaining regions 12b and 12c. That is, in the second region 12b and the third region 12c, light having a wider range of azimuth angles after being reflected many times is incident on the holographic pattern 30. The brightness uniformity decreases as an azimuth angle of light emitted by the LED 20 on the LGP 10 increases.

As shown in FIG. 2, the back light unit further includes two prism sheets 15 and 17 disposed on the LGP 10 so that light obliquely incident on and output from the light-emission surface 12 propagates in the same direction as light diffracted by the holographic pattern 30. Thus, the conventional backlight unit suffers from low optical efficiency, large number of assembling steps, and high manufacturing costs.

SUMMARY OF THE INVENTION

The present invention provides an edge light type backlight unit with brightness uniformity improved by decreasing the range of azimuth angles of light emitted by a light source on a light guide panel.

According to an aspect of the present invention, there is provided a backlight unit including one or more light sources that emit light, a light guide panel that guides the propagation of light incident on one side edge thereof, one or more light-reception portions having a first entrance face slanted opposite the side edge of the light guide panel on which the light is incident at a predetermined angle, and one or more reflecting elements that are disposed between each of the light-reception portions and each of the light sources and guides the light emitted by the light source so that it is incident on the first entrance face.

Here, each of the reflecting elements includes a second entrance face on which the light emitted by the light source is incident, a reflection face that reflects the light incident through the second entrance face so as to change the propagation path of the light, and an exit face that directs the light incident directly from the second entrance face and the light incident through the reflection face toward the light-reception portion. Each of the light-reception portions further includes a reflection guide face with one side contacting the side edge of the light guide panel and the other side contacting the first entrance face.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS OF THE INVENTION

Figure 6:
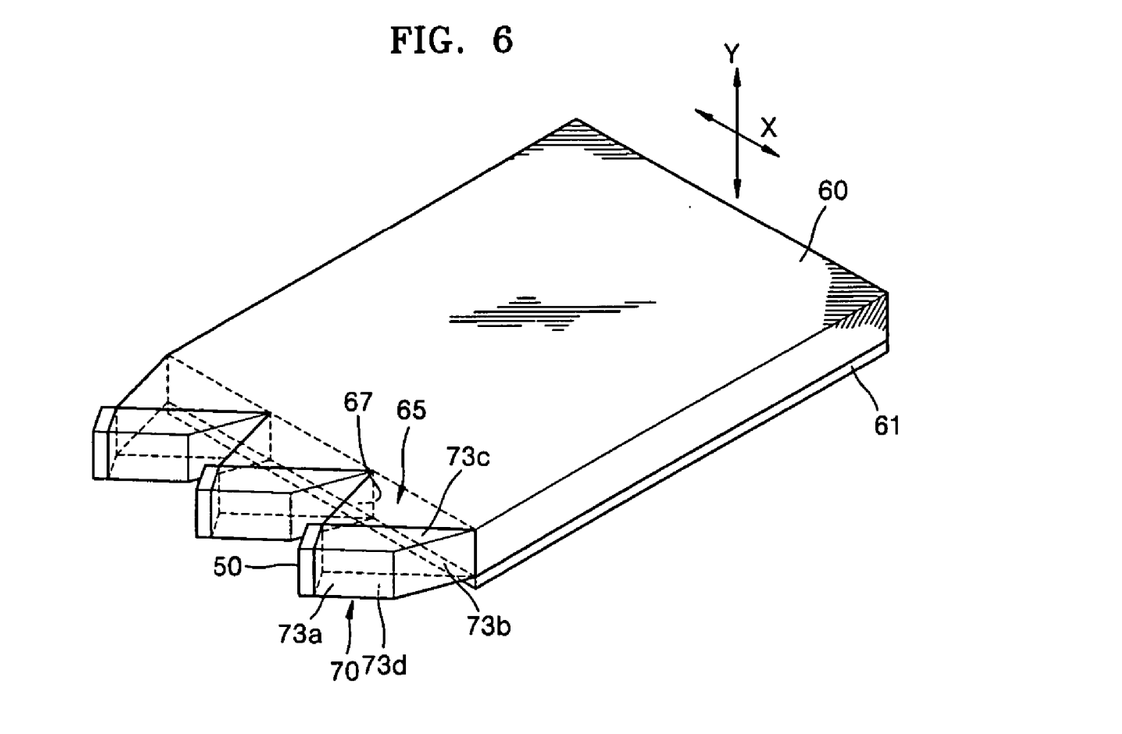
FIG. 6 is a perspective view of a backlight unit according to a first embodiment of the present invention.
Figure 7:
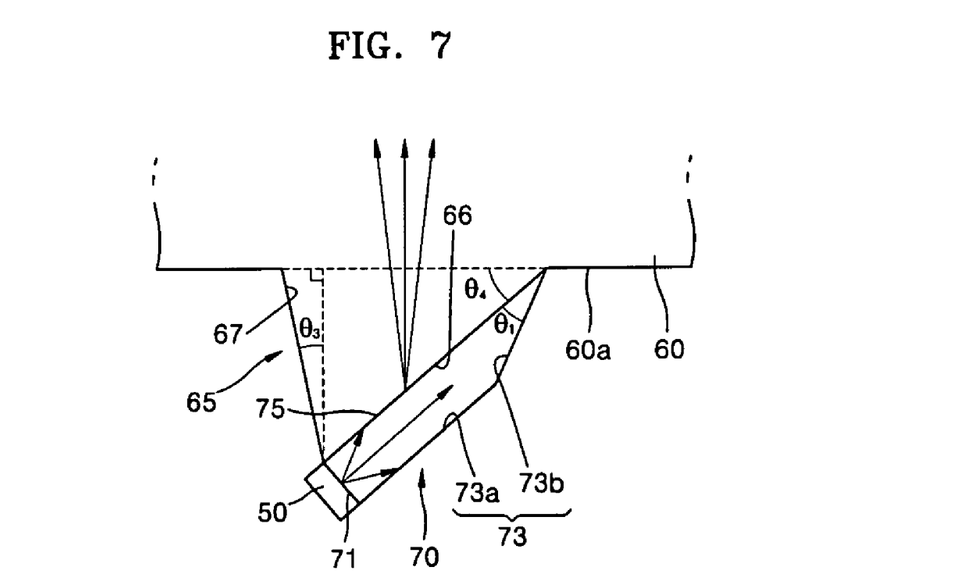
FIG. 7 is a plan view showing a portion of the backlight unit of FIG. 6.

Referring to FIGS. 6 and 7, a backlight unit according to a first embodiment of the present invention includes one or more light sources 50, a light guide panel 60 that guides the propagation of light incident on one side edge 60a thereof, one or more light-reception portion 65 disposed along the side edge 60a of the light guide panel 60, and one or more reflecting elements 70 disposed between the light-reception portion 65 and each of the light sources 50.

The light source 50 may be a point light source such as a light emitting diode (LED) or a linear light source such as a cold cathode fluorescent lamp (CCFL) and emits light on one side of the light guide panel 60. FIG. 6 shows an example of using three LEDs as the light source 50. In this case, corresponding light source 50 and reflecting element 70 are provided for each LED. The LED emits the light in an angular range between −90° and +90° about an optical axis. The LED has a forward half maximum (FWHM) angle between about −45° and +45° as shown in FIG. 3.

While the three light sources 50 have been disposed along one side edge of the light guide plate 60 in the illustrative embodiment, the number of light sources 50 may be more or less than three depending on the type of application since it depends on the size of the light guide panel 60 and brightness required.

The light guide panel 60 guides the propagation of light incident onto the side edge 60a and is made of transparent material that can transmit the incident light. The light guide panel 60 is mainly made of transparent acrylic-based resin having refractive index of 1.49 and specific gravity of 1.19, such as polymethylmethacrylate (PMMA), or transparent olefin-based resin to achieve lightweight. The light guide panel 60 is preferably a flat panel with a thickness of about 2 to 3 mm. Alternatively, the light guide panel 60 may be tapered in thickness away from the entrance side. The size of a light-emission surface of the light guide panel 60 depends on the size of a flat panel in an image display device.

The light guide panel 60 has a holographic pattern 61 at the bottom thereof, which diffracts the light incident through the side edge 60a toward the light-emission surface. The holographic pattern 61 is made up of diffractive gratings repeatedly arranged with a period less than 2 μm. For example, the holographic pattern 61 may have a structure in which diffractive gratings with period of 0.4 μm and depth of 0.2 μm have been arranged repeatedly. A reflecting element (not shown) that reflects the light upward may be located below the holographic pattern 61. Here, as the azimuth angle of the light incident on the holographic pattern 61 decreases and uniformity in distribution of the azimuth angles increases, uniformity in brightness over the light-emission surface of the light guide panel 60 increases.

The light-reception portion 65 and the reflecting element 70 serve to focus light emitted by the light source 50 on the light guide panel 60, thereby decreasing the azimuth angle of the light within the light guide panel 60. To achieve this function, the light-reception portion 65 has a first entrance face 66 slanted against a side edge 60a of the light guide panel 60 irradiated with light at a predetermined angle. The light-reception portion 65 preferably further includes a reflection guide face 67 that reflects the light incident on its surface. One side of the reflection guide face 67 is in contact with the side edge 60a, and the other side is in contact with the first entrance face 66. The light-reception portion 65 located along the side edge 60a is made of the same material having the same refractive index as the light guide panel 60. More preferably, the light-reception portion 65 is integrally formed with the light guide panel 60.

The reflecting element 70 includes a second entrance face 71, a reflection face 73, and an exit face 75 that is disposed opposite the first entrance face 66. The light source 50 is attached to the second entrance face 71 through which light emitted by the light source 50 is incident. The reflection face 73 reflects the light incident through the second entrance face 71 so as to change the propagation path of the light. The exit face 75 directs light incident directly from the second entrance face 71 and light incident through the reflection face 73 toward the light-reception portion 65.

The reflection face 73 may be constructed in different ways, and an example thereof will now be described with reference to FIGS. 6 and 7. The reflection face 73 has first and second rear faces 73a and 73b inclined at different angles and top and bottom faces 73c and 73d disposed opposite and spaced apart from each other by a predetermined distance. The distance between the top and bottom faces 73c and 73d is substantially equal to the thickness of the light guide panel 60. The first rear face 73a has one side contacting the second entrance face 71 and is disposed parallel to the exit face 75. The second rear face 73b has one side contacting the first rear face 73a and is slanted opposite the exit face 75 at a predetermined angle. Where an included angle between the second rear face 73b and the exit face 75 is $\theta_1$, the included angle $\theta_1$ is in the range defined by Inequality (1):

$$10° \leq \theta_1 \leq 30° \tag{1}$$

Here, when the included angle $\theta_1$ is less than the lower limit 10°, an angle of light reflected from the second rear face 73b is shifted toward the right side of the light guide panel 60, thus hindered in decreasing the azimuth angle of the light. When the included angle $\theta_1$ is greater than the upper limit 30°, light reflected from the second rear face 73b returns toward the light source 50, thereby decreasing optical efficiency. Considering the above requirements, in an exemplary embodiment the included angle $\theta_1$ is about 18°.

In the reflecting element 70 constructed above, the arrangement of the light-reception portion 65 is determined by angles $\theta_3$ and $\theta_4$. $\theta_3$ is an included angle between the reflection guide face 67 and a normal perpendicular to the side edge 60a opposite the light-reception portion 65, and in an exemplary embodiment it is in the range defined by Inequality (2):

$$5° \leq \theta_3 \leq 20° \tag{2}$$

Here, when the included angle $\theta_3$ is less than the lower limit 5°, light uniformity is reduced and total internal reflection does not occur at the reflection guide face 67. When the included angle $\theta_3$ is greater than the upper limit 20°, an angle of light reflected from the reflection guide face 67 is shifted toward the left side of the light guide panel 60, thus hindered in decreasing the azimuth angle of the light. Considering the above requirements, in an exemplary embodiment the included angle $\theta_3$ is about 13°.

$\theta_4$ is an included angle between the side edge 60a and the first entrance face 66, and in an exemplary embodiment it is in the range specified in Inequality (3):

$$10° \leq \theta_4 \leq 50° \tag{3}$$

Here, when the included angle $\theta_4$ is less than the lower limit 10°, an angle of light refracted through the first entrance face 66 is shifted toward the right side of the light guide panel 60, thereby increasing the azimuth angle of the light. Conversely, when the included angle $\theta_4$ is greater than the upper limit 50°, the angle of light refracted through the first entrance face 66 is shifted toward the left side, thus hindered in decreasing the azimuth angle of the light. Considering the above requirements, in an exemplary embodiment the included angle $\theta_4$ is about 33°.

Figure 8:
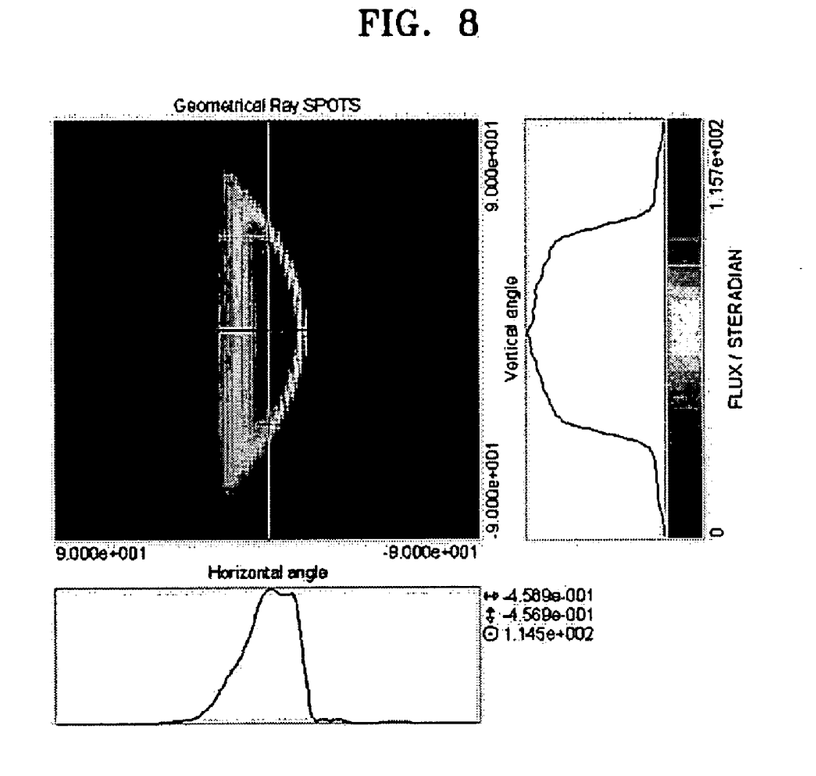
FIGS. 8 and 9 illustrate angular distributions of light emitted by the backlight unit of FIG. 6.
Figure 9:
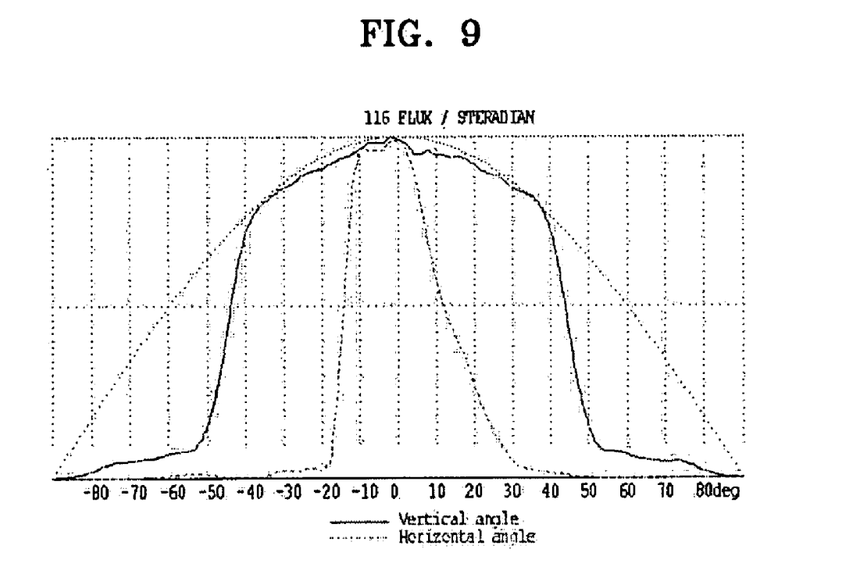

FIGS. 8 and 9 illustrate angular distributions of transmitted light when the light-reception portion 65 and the reflecting element 70 are constructed above and angles $\theta_1$, $\theta_3$, and $\theta_4$ are set to 18°, 13°, and 33°, respectively. Here, horizontal and vertical angles denote azimuth angles in X-and Y-coordinate directions in FIG. 6. As is evident by FIGS. 8 and 9, when the backlight unit includes the light reception portion 65 and the reflecting element 70 constructed and arranged above, it has an FWHM angle with a very small width of 22° (between about −10° and 12°) in the X-coordinate direction. Accordingly, high efficiency of light that irradiates a display through the light guide panel 60 can be achieved along with uniformity in angular and intensity distributions of light.

Figure 10:
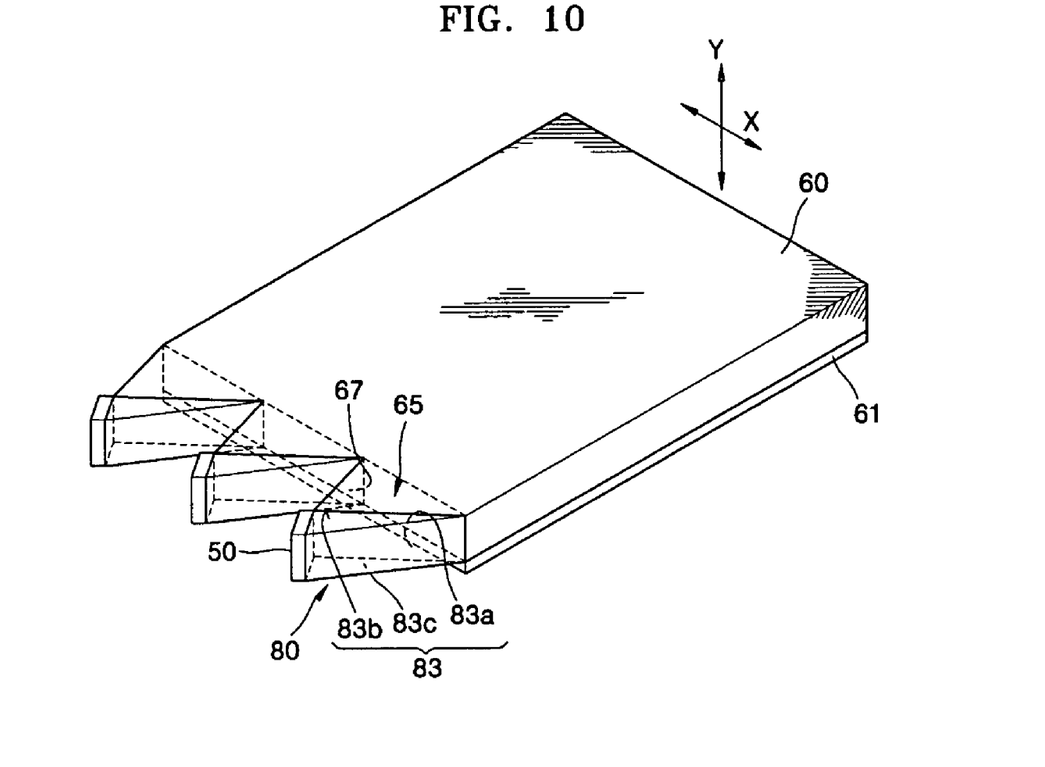
FIG. 10 is a perspective view of a backlight unit according to a second embodiment of the present invention.
Figure 11:
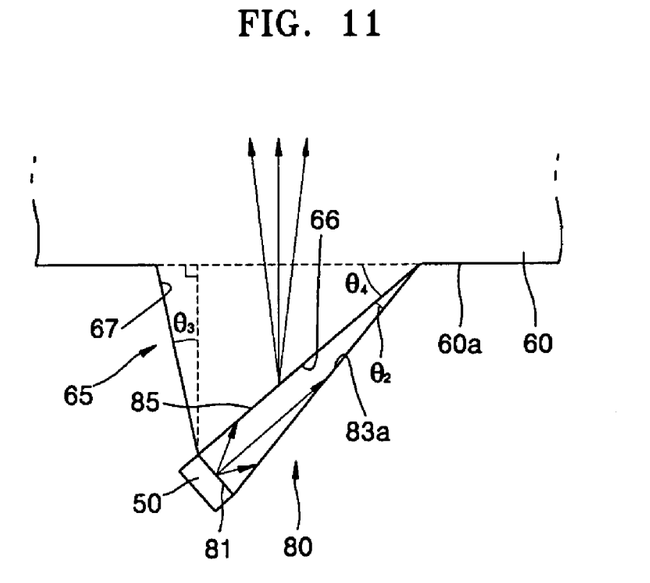
FIG. 11 is a plan view showing a portion of the backlight unit of FIG. 10.

Referring to FIGS. 10 and 11, a backlight unit according to a second embodiment of the present invention includes one or more light sources 50, a light guide panel 60 that guides the propagation of light incident on one side edge 60a thereof, a light-reception portion 65 disposed along the side edge 60a, and a reflecting element 80 disposed between the light-reception portion 65 and each of the light sources 50. Here, since the light guide panel 60 and the light-reception portion 65 having substantially the same constructions as counterparts in the first embodiment, a detailed description thereof will not be given.

The reflecting element 80 includes a second entrance face 81, a reflection face 83, and an exit face 85 that is disposed opposite the first entrance face 66. The light source 50 is attached to the second entrance face 81 through which light emitted by the light source 50 is incident. The reflection face 83 reflects the light incident through the second entrance face 81 so as to change the propagation path of the light. The exit face 85 directs light incident directly from the second entrance face 81 and light incident through the reflection face 83 toward the light-reception portion 65.

The reflection face 83 has a rear face 83a sloped at a predetermined angle and top and bottom faces 83b and 83c disposed opposite and spaced apart from each other by a predetermined distance. The distance between the top and bottom faces 83b and 83c is substantially equal to the thickness of the light guide panel 60. The rear face 83a has one side contacting the second entrance face 81 and is slanted opposite the exit face 85 at an angle. Further, the rear face 83a has a planar structure. Where an included angle between the rear face 83a and the exit face 85 is $\theta_2$, the included angle $\theta_2$ is in the range defined by Inequality (4):

$$10° \leq \theta_2 \leq 30° \tag{4}$$

Here, when the included angle $\theta_2$ is less than the lower limit 10°, an angle of light reflected from the rear face 83a is shifted toward the right side of the light guide panel 60, thus hindered in decreasing the azimuth angle of the light. When the included angle $\theta_2$ is greater than the upper limit 30°, light reflected from the rear face 83a returns toward the light source 50, thereby decreasing optical efficiency.

Figure 12:
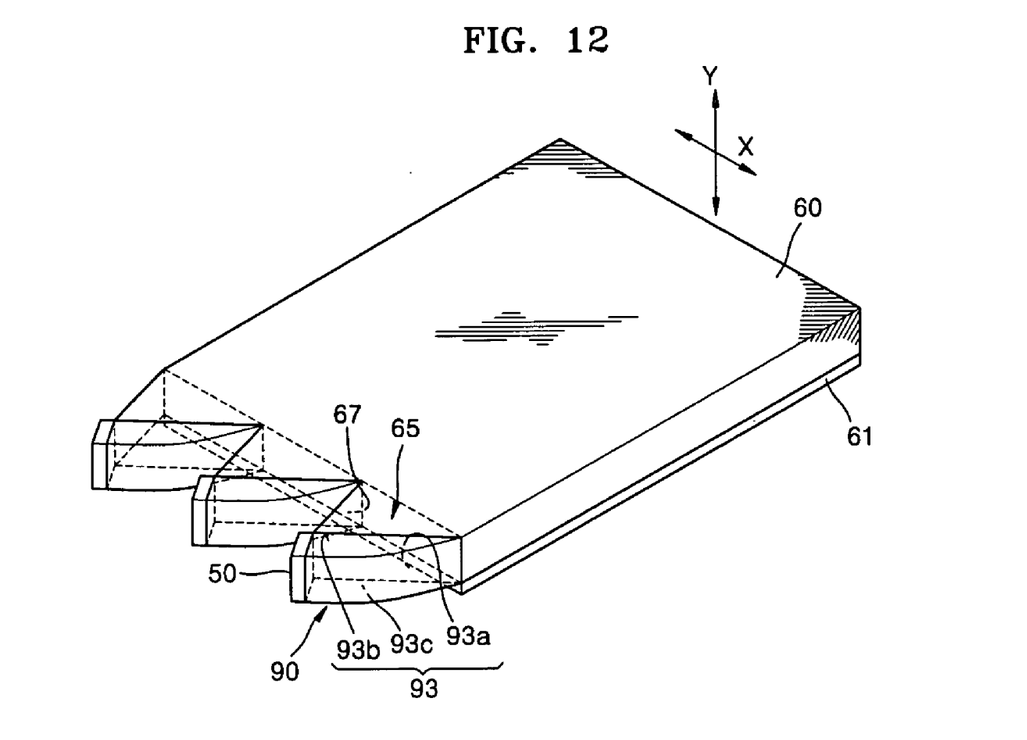
FIG. 12 is perspective view of a backlight unit according to a third embodiment of the present invention.
Figure 13:
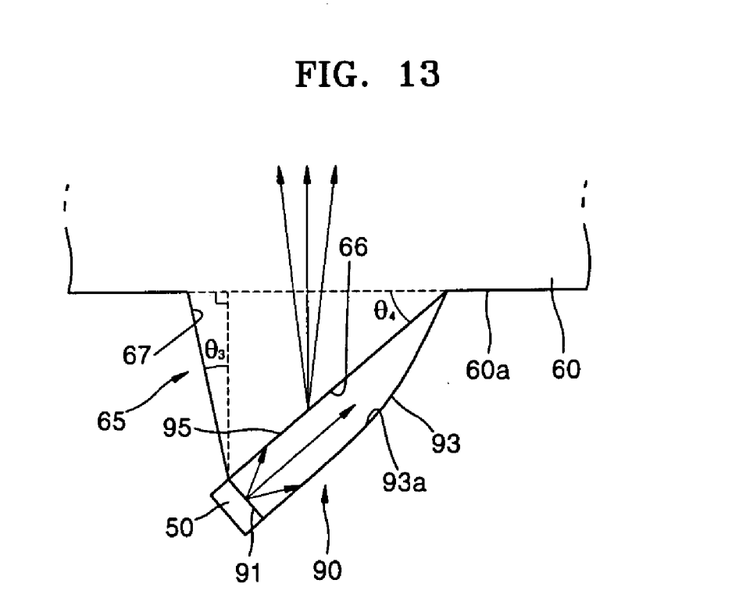
FIG. 13 is a plan view showing a portion of the backlight unit of FIG. 12.

Referring to FIGS. 12 and 13, a backlight unit according to a third embodiment of the present invention includes one or more light sources 50, a light guide panel 60 that guides the propagation of light incident on one side edge 60a thereof, a light-reception portion 65 disposed along the side edge 60a, and a reflecting element 90 disposed between the light-reception portion 65 and each of the light sources 50. Here, since the light guide panel 60 and the light-reception portion 65 having substantially the same constructions as counterparts in the first embodiment, a detailed description thereof will not be given.

The reflecting element 90 includes a second entrance face 91, a reflection face 93, and an exit face 95 that is disposed opposite the first entrance face 66. The light source 50 is attached to the second entrance face 91 through which light emitted by the light source 50 is incident. The reflection face 93 reflects the light incident through the second entrance face 91 so as to change the propagation path of the light. The exit face 95 directs light incident directly from the second entrance face 91 and light incident through the reflection face 93 toward the light-reception portion 65.

The reflection face 93 has a rear face 93a sloped at a predetermined angle and top and bottom faces 93b and 93c disposed opposite and spaced apart from each other by a predetermined distance. Both sides of the rear face 93a are in contact with the second entrance face 91 and the exit face 95, respectively. Here, the rear face 93a is aspherically curved and serves as a concave reflecting mirror. Thus, light incident on the rear face 93a converges in the X-axis direction toward the light-reception portion 65, thereby decreasing the azimuth angle of light transmitted through the light guide panel 60.

When the azimuth angle of light incident on the light guide panel 60 is small, since the light is incident on the holographic pattern 61 at an angle near 90°, the light guide panel 60 is able to emit light very efficiently. Furthermore, since the distribution of azimuth angles of the light incident on the holographic pattern 61 is uniform, the distribution of azimuth angles of light exiting the light guide panel 60 is also uniform, thus improving uniformity in brightness.

A backlight unit according to the present invention has a narrow range of azimuth angles of light incident on the light guide panel, thereby increasing efficiency of light being emitted to a display device. Furthermore, the backlight unit achieves a high uniformity in distribution of intensity of the emitted light, thus improving uniformity in brightness over a light-emission surface of the light guide panel. In addition, optical arrangement of the reflecting element makes it possible to maintain a narrow distribution of azimuth angles of emitted light without using a separate prism plate, thereby reducing the number of component parts.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit comprising:
   one or more light sources that emit light;
   a light guide panel that guides the propagation of light incident on one side edge thereof;
   one or more light-reception portions having a first entrance face slanted opposite the side edge of the light guide panel on which the light is incident at a predetermined angle; and
   one or more reflecting elements that are disposed between each of the light-reception portion and each of the light sources and guides the light emitted by the light source so that it is incident on the first entrance face;
   wherein each of the one or more reflecting element comprises:
   a second entrance face on which the light emitted by the light source is incident;
   a reflection face that reflects the light incident through the second entrance face so as to change the propagation path of the light, and
   an exit face that directs the light incident directly from the second entrance face and the light incident through the reflection face toward the light-reception portion.

2. The backlight unit of claim 1, wherein the reflection face comprises:
   top and bottom faces disposed opposite and spaced apart from each other by a predetermined distance;
   a first rear face that has one side contacting the second entrance face and is disposed parallel to the exit face; and
   a second rear face that has one side contacting the first rear face and is slanted opposite the exit face at a predetermined angle.

3. The backlight unit of claim 2, wherein where an included angle between the second rear face and the exit face is $\theta_1$, the included angle $\theta_1$ is in a range defined by a conditional expression $10° \leq \theta_1 \leq 30°$.

4. The backlight unit of claim 3, wherein the included angle $\theta_1$ is about 18°.

5. The backlight unit of claim 1, wherein the reflection face comprises:
   top and bottom faces disposed opposite and spaced apart from each other by a predetermined distance; and
   a rear face that has one side contacting the second entrance face and is slanted opposite the exit face at an angle, wherein the rear face has a planar structure.

6. The backlight unit of claim 5, wherein where an included angle between the rear face and the exit face is $\theta_2$, the included angle $\theta_2$ is in a range defined by a conditional expression $10° \leq \theta_2 \leq 30°$.

7. The backlight unit of claim 1, wherein the reflection face comprises:
   top and bottom faces disposed opposite and spaced apart from each other by a predetermined distance; and
   a rear face that is aspherically curved and has one side contacting the second entrance face and the other side contacting the exit face.

8. The backlight unit of claim 1, wherein each of the light-reception portion further comprises a reflection guide face having one side contacting the side edge of the light guide panel and the other side contacting the first entrance face.

9. The backlight unit of claim 8, wherein where $\theta_3$ is an included angle between the reflection guide face and a normal perpendicular to the side edge of the light guide panel opposite the light-reception portion, the included angle $\theta_3$ is in a range defined by a conditional expression $5° \leq \theta_3 \leq 20°$.

10. The backlight unit of claim 9, wherein the included angle $\theta_3$ is about 13°.

11. The backlight unit of claim 8, wherein each of the light-reception portion is integrally formed with the light guide panel.

12. The backlight unit of claim 1, wherein where $\theta_4$ is an included angle between the side edge of the light guide panel and the first entrance face, the included angle $\theta_4$ is in a range defined by a conditional expression $10° \leq \theta_4 \leq 50°$.

13. The backlight unit of claim 12, wherein the included angle $\theta_4$ is about 33°.

* * * * *